US 8,146,103 B2

(12) United States Patent
Schmidt et al.

(10) Patent No.: US 8,146,103 B2
(45) Date of Patent: Mar. 27, 2012

(54) AGGREGATION AND EVALUATION OF MONITORING EVENTS FROM HETEROGENEOUS SYSTEMS

(75) Inventors: Patrick Schmidt, Heidelberg (DE); Rene Niebuhr, Wiesloch (DE)

(73) Assignee: SAP AG, Walldorf (DE)

( * ) Notice: Subject to any disclaimer, the term of this patent is extended or adjusted under 35 U.S.C. 154(b) by 1237 days.

(21) Appl. No.: 11/851,388

(22) Filed: Sep. 6, 2007

(65) Prior Publication Data
US 2009/0070784 A1   Mar. 12, 2009

(51) Int. Cl.
*G06F 9/44* (2006.01)
*G06F 15/173* (2006.01)
(52) U.S. Cl. .......................... 719/318; 709/223; 709/224
(58) Field of Classification Search ................... 719/310, 719/311, 315, 316, 318, 328; 709/203, 223, 709/224
See application file for complete search history.

(56) References Cited

U.S. PATENT DOCUMENTS

| | | | | |
|---|---|---|---|---|
| 7,627,853 | B2* | 12/2009 | Ibert et al. | 717/108 |
| 7,768,518 | B2* | 8/2010 | Collins et al. | 345/505 |
| 2002/0099579 | A1* | 7/2002 | Stowell et al. | 705/7 |
| 2003/0126240 | A1* | 7/2003 | Vosseler | 709/221 |
| 2005/0138642 | A1* | 6/2005 | Breh et al. | 719/318 |
| 2006/0047545 | A1* | 3/2006 | Kumar et al. | 705/7 |
| 2006/0168478 | A1* | 7/2006 | Zakonov | 714/38 |
| 2009/0037193 | A1* | 2/2009 | Vempati et al. | 705/1 |
| 2009/0037240 | A1* | 2/2009 | Schmidt et al. | 705/7 |
| 2009/0063218 | A1* | 3/2009 | Stuhrmann et al. | 705/7 |

* cited by examiner

*Primary Examiner* — Van Nguyen
(74) *Attorney, Agent, or Firm* — Mintz Levin Cohn Ferris Glovsky and Popeo, P.C.

(57) ABSTRACT

A system and method for monitoring activity of heterogeneous systems within a business application landscape are disclosed. An object state change is detected in an object instance of one or more systems of the business application landscape. Each object state change is filtered according to one or more conditions related to the object instance. If the one or more conditions are met for an object state change, a filtered workflow event is generated, and the filtered workflow event is mapped to a common message proxy to generate a monitoring event message. Via the common message proxy, the monitoring event message is sent to a centralized monitoring process in an event resolution center of a portal server.

14 Claims, 3 Drawing Sheets

AGGREGATION AND EVALUATION OF MONITORING EVENTS FROM HETEROGENEOUS SYSTEMS

BACKGROUND

This disclosure relates generally to computer-based mechanisms for monitoring activity of a business application, and more particularly to an infrastructure for monitoring local events of a distributed business application.

Business applications, such as Customer Relationship Management (CRM) applications, Enterprise Resource Planning (ERP) applications, or Product Lifecycle Management (PRM) applications, usually lack communications necessary to be able to accurately monitor business activity within the application. Further, many business applications are executed across a distributed computing landscape having a number of heterogeneous data sources. Resolution of anomaly events within the business activity is very difficult or impossible because of such different data sources and different interpretations of events that occur with such data.

One comprehensive solution to the problem of monitoring activity of a business application is the Business Activity Monitoring (BAM) platform provided by SAP AG of Walldorf, Germany. A monitoring system such as BAM monitors workflow events of business impact within an executing business application, and deduces actions if necessary. BAM can span both the applications of an application system landscape as well as the application orchestration layer, i.e. the integration processes.

What is needed is a system for monitoring events within a business application, and further to correlate monitoring events into a unified event system.

SUMMARY

In general, this document discusses a system and method for correlating, aggregating and evaluating monitoring events from heterogeneous sources of a business application. The system and method further unify the monitoring events in an event system to modulate their effect and translate them into standardized integrated messages.

In one aspect, a method of monitoring activity of heterogeneous systems within a business application landscape includes steps of detecting an object state change in an object instance of one or more systems of the business application landscape, and filtering each object state change according to one or more conditions related to the object instance. If the one or more conditions are met for an object state change, a filtered workflow event is generated. The method further includes mapping the filtered workflow event to a common message proxy to generate a monitoring event message, and via the common message proxy, sending the monitoring event message to a centralized monitoring process in an event resolution center of a portal server.

In another aspect, a method of monitoring activity of a heterogeneous systems within a business application landscape includes steps of defining, in a modeling tool in portal server, one or more conditions for object instances of one or more systems of the business application landscape, detecting an object state change in one or more of the object instances, and filtering each object state change according to the one or more conditions. The method further includes, if the one or more conditions are met for an object state change, generating a filtered workflow event, and mapping the filtered workflow event to a common message proxy to generate a monitoring event message.

In yet another aspect, an article comprising a machine-readable medium embodying instructions that when performed by one or more machines result in operations to monitor activity of a heterogeneous systems within a business application landscape. The operations configure the article to detect an object state change in an object instance of one or more systems of the business application landscape, and filter each object state change according to one or more conditions related to the object instance. If the one or more conditions are met for an object state change, a filtered workflow event is generated and mapped to a common message proxy to generate a monitoring event message.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
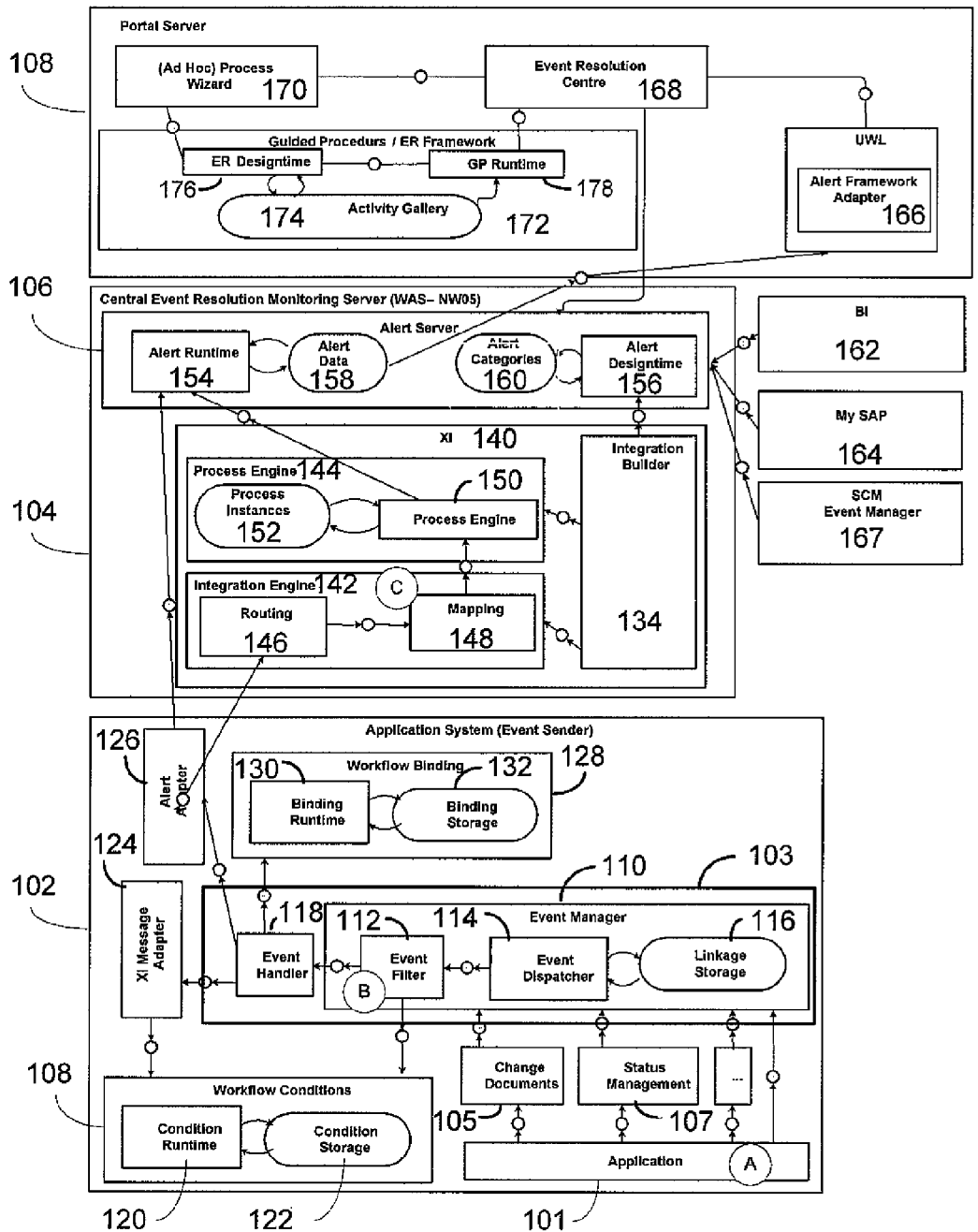
FIG. 1 is a block diagram of a business application system for aggregation and evaluation of monitoring events from heterogeneous systems.

This document describes a business activity monitoring system and method to unify event systems and modify their reach across a heterogeneous application landscape. Event systems are redefined as monitoring events in the form of a message. In preferred implementations, the monitoring event messages are in the form of exchange infrastructure (XI) messages provided by SAP AG. Accordingly, third party and legacy systems can contribute to business activity monitoring scenarios.

A monitoring process collects events raised by heterogeneous systems, and deduces action items to be completed by business experts. Monitoring processes are predefined using an Integration Builder (IB) tool or the like, and work items are created as a consequence of process execution. BAM also introduces the concept of a monitoring even. A monitoring event is a notification in the form of an exchange infrastructure (XI) message sent to the monitoring process about a significant state change in the business application system.

An application can discharge monitoring events using message communication, and therefore a monitoring event also represents a message interface that refers to message type, etc. Each already existing message communication can be used to supply monitoring processes with information. Additional monitoring events are necessary when no message communication exists already.

A monitoring process collects events raised by diverse sources such as an application system or component of a business suite, and deduces action items to be completed by business experts. The monitoring processes are predefined using an Integration Builder (IB) tool or the like, and work items are created as a consequence of process execution. Monitoring processes can also represent the so-called "end-to-end" business processes to show milestones.

A monitoring event is a notification sent to the monitoring process about a significant state change in the application system or component. In preferred implementations, the transport medium of monitoring events are messages, and the transport mechanism is a messaging infrastructure. Thus, monitoring events are transported as messages, and heterogeneous systems in the application system landscape can participate in monitoring processes.

An application can discharge monitoring events using message communication, and therefore a monitoring event also represents a message interface that refers to message type, etc. Each already existing message communication can be used to supply monitoring processes with information. Additional monitoring events are necessary when no message communication already exists. Workflow events can be used to enable application systems to fire monitoring events to eventually produce an event resolution Workflow events are created all over the system directly, or indirectly via 'generic event enablers' such as business transaction events, a message control (NAST) system, a Post Processing Framework (PPF), Change Documents, a Logistics Information System, change of personnel data, etc.

FIG. 1 illustrates a business application system 100 that aggregates and evaluates monitoring events detected from one or more heterogeneous business applications 101. The business application system 100 monitors the relevant business issues across the business application system 100, normalizes the issues into a standard message protocol, alerts responsible users, and supports the resolution of the business issues. A business issue can be an error in the runtime of a business application 101, an integration problem among two or more business applications 101 or systems, or other problem that affects the proper functioning of the business applications 101. The business application system 100 includes an application system 102, a central event resolution monitoring server 104 including an alert server 106, and a portal server.

Detecting business issues is performed by a local event infrastructure 103 as a part of the application system 102. The local event infrastructure 103 includes an event manager 110 to manage detection of events and mapping the events to exchange infrastructure (XI) messages. The event manager 110 includes an event dispatcher 114 that interprets linkage tables in a linkage storage 116 between events of an application 101 and an event consumer, such as a BAM system. The events are detected by the event manager from a change documents module 105, an application status management module 107, or other module that can generate a message representing a state change of an instance of an application 101 process.

The event manager 110 further includes an event filter 112 that filters events based on conditions, thresholds, parameters, etc., and checks the relevance of the events, based on workflow conditions 108. The event filter 112 then executes an event handler 118 for relevant events. The workflow conditions 108 includes a condition storage 122 that stores one or more conditions of a workflow of the application 101, and which are executed and evaluated by a condition runtime engine 120. As will be discussed below, the conditions can be established via modeling tool such as an integration builder 134.

The event handler 118 translates relevant events into a monitoring event based at least in part on a workflow binding module 128. The workflow binding module 128 includes a binding storage 132 and a binding runtime engine 130 that executes a binding function. The event handler 118 also prepares an alert for the monitoring event via an alert adapter 126. In some implementations, events generated by heterogeneous sources are normalized to XI messages that can be selectively linked to other XI messages. Such events include workflow events created all over the system landscape.

As discussed above, the integration builder 134 is used to define the monitoring events, monitoring processes, process-relevant alert categories, mappings, etc., and to configure each monitoring process. To streamline the setup of the local event infrastructure 103, settings will be made centrally to the greatest extent possible. The integration builder 134 is part of the XI 140. The XI 140 also includes a integration engine 142 and a process engine 144. The integration engine 142 includes a routing module 146 to route XI message-configured monitoring events to the desired message recipient, i.e. the alert server 106. The integration engine 142 also includes a mapping module 148 to map monitoring events to monitoring processes. The monitoring processes are executed by a process engine 150 that is controlled by the integration builder 134, and which generates and runs process instances 152.

The alert server 106 is configured to manage and link alert categories to users. The alert server 106 includes an alert design time module 156 that generates and stores the alert categories 160. The alert server 106 further includes an alert runtime 154 that generates and stores alert data 158 based on messages received either from the process engine 150 or from the alert adapter 126 in the application system 102. Alerts needing or requiring resolution are sent in the form of alert data to an alert framework adapter for resolution in the portal server 108.

Several components can have access to or supply information to the alert server 106. The alert server 106 may be connected with a business intelligence (BI) system 162. BI is adapted to configure key performance indicators for the business application system 100. A role-based set of application tools, such as a MySAP suite of application tools 164, can be used by the alert server 106. Finally, an application-specific event manager 167 can be used to manage events as indicated by the alert server 106.

The portal server 108 provides a portal that includes an event resolution center 168, a graphical user interface in which a user can resolve issues for which alerts have been generated and for which monitoring events and monitoring processes have been created. The event resolution center 168 can be connected to a process wizard 170, which can logically, and in an ad-hoc manner, walk a user through steps to resolve or fix the issue, and can track user actions in such resolutions.

The process wizard 170 and event resolution center 168 use a guided procedures/event resolution framework 172. This framework 172 includes an activity gallery 174 of possible activities that can be undertaken by a user of the portal server. The activities in the activity gallery 174 are used by an event resolution design time module 176, which creates templates of possible resolutions to issues. The activities are also used by a guided procedure runtime module 178 which executes guided procedures for the event resolution center 168. The event resolution design time module 176 can also save new activities to the activity gallery 174 based on feedback from the process wizard 170 for dynamic, self-learning and future use.

Monitoring events are messages mapped into messages that can be routed to a ccBPM process instance using correlations. This mapping also offers the full range of data sources for event resolution, while enabling recognition of information already provided by existing interfaces (RFCs, iDocs, Proxies, . . . ). Thus, even 'normal' messages for integration purposes can be used to provide information to a monitoring process without changing the backend system. Monitoring events as 'normal' messages carry identifiers that enable correlation into a running process instance. Alert categories produce workflow events that can be used to fire monitoring events. Since monitoring events are configured as 'normal' messages, any type of system that is able to send messages can participate in a monitoring process.

Monitoring events are preferably transported using an integration server architecture called Exchange Infrastructure (XI) and assuming XI-message-communication (using proxies, RFCs or idocs). An application can fire monitoring events using message communication. That means a monitoring event is a message interface (referring to message type, and so on) in integration repository terms. Each existing message communication can be used to supply monitoring processes with information. Additional monitoring events may be necessary when no message communication exists already.

Workflow events are used to enable application systems to fire monitoring events. These workflow events are mapped structurally from business object to message proxy and filtered, at least in part to avoid an overload of the central integration server. Workflow events are a common mechanism to signal an object state change to an instance that decides whether a monitoring event needs to be created.

Monitoring events are converted from workflow events, and result in a proxy call in the local application system. The event data is sent by the proxy to the monitoring process instance. Monitoring events as message interfaces and the configuration of the routing are maintained centrally on the integration builder repository and directory. The connection between workflow events and monitoring events is created locally on the respective application system. Alert management can also be considered as a generic event enabler for workflow events. Data from the alert data context can be mapped to workflow events to be used for firing monitoring events.

Figure 2:
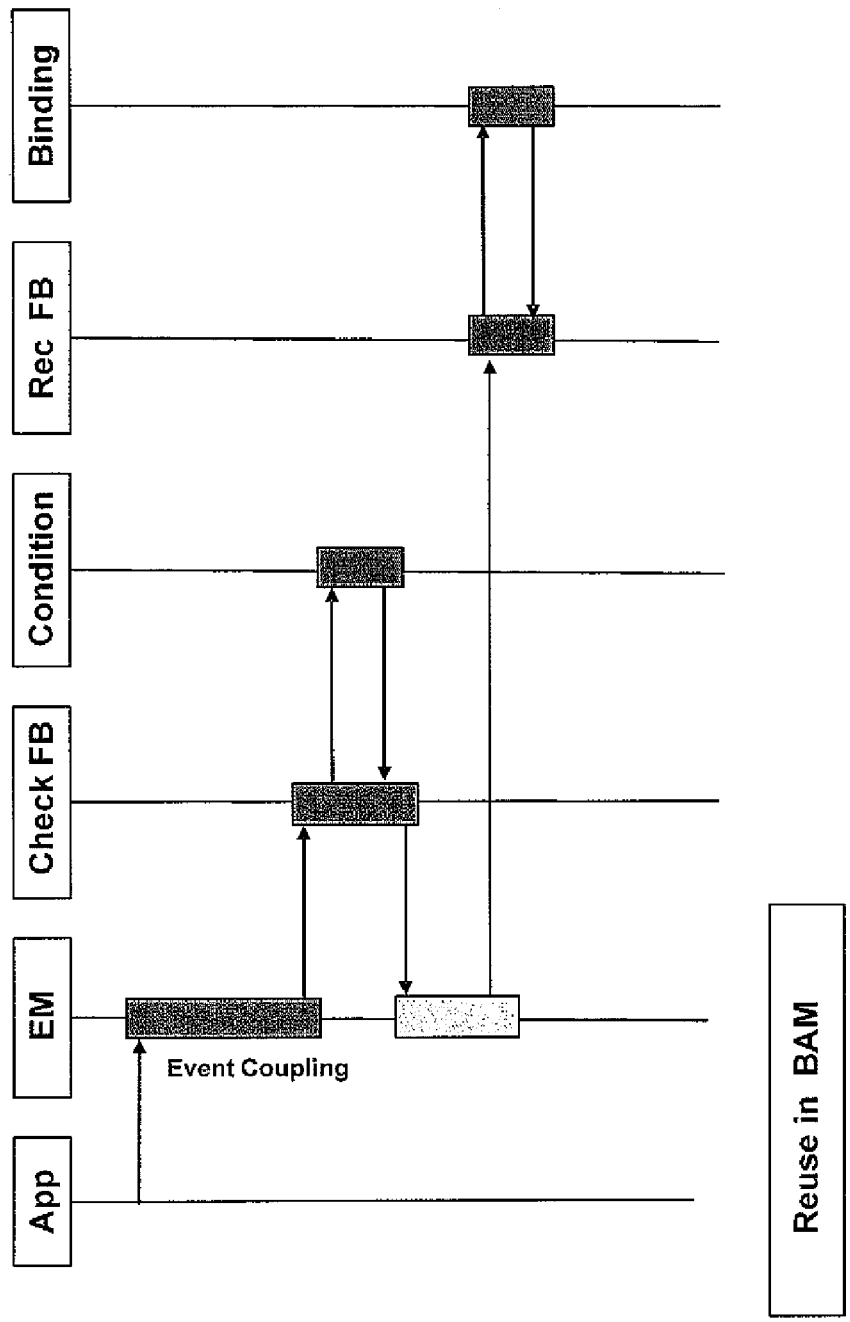
FIG. 2 shows a workflow event execution sequence of an event manager.

With reference also to FIG. 2, the workflow event execution sequence is as follows: the event manager receives the event. A predefined check (function) module may check the relevance of the event (generic using workflow conditions), the receiver (function) module executes required actions after having received the event data via binding. The event manager and the other components shown are reused from the workflow infrastructure as summarized in the following table:

| Reuse Component | Purpose |
| --- | --- |
| Event Coupling Table | Defines relation between Event and Proxy |
| Check (function) module | Defines generic (function) module for Filtering |
| Receiver (function) module | Defines generic (function) module for communication (proxy execution) |
| Condition | Filters Conditions |
| Binding | Supply data to from Workflow Event to Proxy |

Maintenance of the tables of the local event infrastructure is only possible on the application system itself, since only there are the business objects and events known. Also defining the data binding to supply the event data to the monitoring event (message) needs also to be done on the application system, because only there, both the workflow Event and the Monitoring Event is known.

Not all business object state changes are relevant for event resolution in the BAM system, and whether or not a monitoring event needs a decision is made. This decision is evaluated locally (in the application system, before the monitoring events is transmitted via external communication) to minimize external communication and to provide all application data as decision base for the condition that decides whether the event is event resolution relevant or not.

The event filter performs filtering using a "start condition" that runs on business objects to reduce the delivered events. Alternatively, check-functions allow stopping an event upon an application decision. Each application can create a check-function for each case or use the more generic start conditions. Start conditions are preferably only used for workflow start, but could be adapted to check all kinds of events. These conditions are maintained locally in the application system. Event coupling and condition definition should be done locally in the application system to access the object attributes and available events. In addition, some applications need customizing steps to enable firing events.

There are a number of places within the business application system 100 where it can be decided whether a status change (event in application system) or a message communication is relevant for a monitoring process. As shown in circled reference characters, the locations or points in time can be the following: very early filtering on the application system (A); early filtering on the application system in the workflow event (B); late filtering on the integration server (C).

Different filter locations mean different costs for the overall filtering process. The earlier a monitoring event can be intercepted (that means declared as not relevant) the lower the costs are. The earlier filtering takes place, the more data is available. That means, e.g. filtering on the integration server costs most, because the monitoring event is already on the wire and only the message payload is subject to filter conditions. Also, the later filtering takes place the more can be deployed from a central maintenance tool.

Very early filtering on the Application System can be done by the application using application specific customizing, or alternatively reusing the workflow condition editor. Early filtering on the application system is possible using the 'Start Condition' discussed above.

The workflow event mechanism already provides a mechanism to reduce the delivered events. The check-functions allow stopping an event upon application decision. Each application can create an own check-function for each case or use the more generic mechanism of so-called start conditions. Start conditions can be used for workflow start, but could be adapted to check all kinds of events. These conditions must be maintained locally in the application system as long the integration repository has no access to the business object meta-model of each application system. The business objects do not exist in the integration builder.

The event coupling and the start conditions are maintained locally in the application system, because only there are all needed repositories (e.g. BOR, Class Library, . . . ) available. That means the event coupling and the condition definition are done locally in the application system to access the object attributes and available events. In addition, some applications need customizing steps to enable firing events.

All data on which a condition is running must be gathered before the condition is executed. Thus, if a condition execution needs more data than available in the process container, the person modeling the process must call several services (using the XI messaging layer via Send and Receive steps) to get the data in the process container. The process can react upon errors during this data enrichment phase and eventually react upon these errors and propagate alert. This makes sure that the condition technology will not implement yet another workflow tool to handle exceptions during a data enrichment phase.

Figure 3:
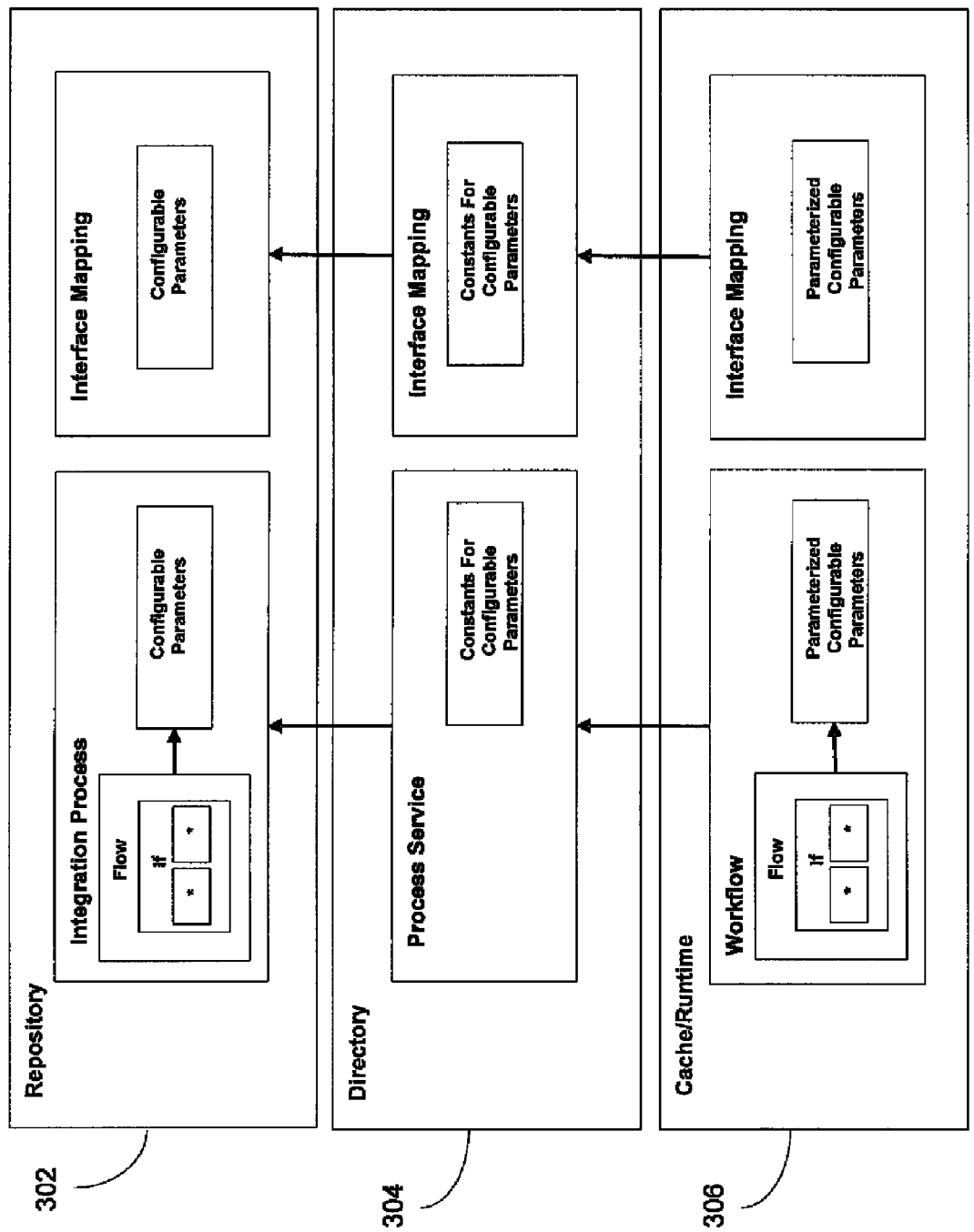
FIG. 3 is a functional flow diagram of configurable parameters for processes.

FIG. 3 is a functional flow diagram of an XI environment 300 illustrating configurable parameters for monitoring processes during monitoring process definition. A cache/runtime 306 includes a workflow and an interface mapping, each having parameterized configurable parameters. Content (agnostic of concrete business systems at customer's site) for an integration repository 302 can be delivered to customers while the content of an integration directory 304 contains links to business systems (e.g. URLs, . . . ). According to the XI architecture, the conditions only need to be configured in the integration directory 304. In the integration repository 302, conditions can be changed directly.

Referring back to FIG. 1, conditions are used in the integration processes 152 as well as in the routing 146. Routing condition definition is already located in the integration directory 304, so changes to the complete condition can take place there directly. Parameters for the conditions are defined in the integration repository 302 and configured in the integration directory 304. According to a general XI approach for parameterizable objects, the integration process will get a signature in the integration repository 302 and be configured in the integration directory 304. This approach helps the user to avoid mistakes. Exposing the parameterizable constants on the process level allows to use the parameter in several conditions and to configure it only once.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method of monitoring activity of heterogeneous systems within a business application landscape, the method comprising:
   detecting an object state change in an object instance of one or more systems of the business application landscape;
   filtering each object state change according to one or more conditions related to the object instance;
   if the one or more conditions are met for an object state change, generating a filtered workflow event;
   mapping the filtered workflow event to a common message proxy to generate a monitoring event message, the common message proxy maintaining routing configuration of a message interface of the monitoring event message from each of the one or more systems to a centralized monitoring process in an event resolution center of a portal server; and
   via the common message proxy, sending the monitoring event message to the centralized monitoring process;
   aggregating two or more event messages in the centralized monitoring process; and
   executing a guided procedures program in the centralized monitoring process to generate an event resolution.

2. A method in accordance with claim 1, further comprising generating an alert based on selected monitoring event messages.

3. A method in accordance with claim 1, further comprising mapping the monitoring event message to the centralized monitoring process according to one or more message mappings stored in a message exchange server.

4. A method in accordance with claim 3, further comprising routing the monitoring event message to the event resolution center based on one or more routing rules in the message exchange server.

5. A method in accordance with claim 1, further comprising defining the one or more conditions in a modeling tool via the portal server.

6. A method of monitoring activity of a heterogeneous systems within a business application landscape, the method comprising:
   defining, in a modeling tool in portal server, one or more conditions for object instances of one or more systems of the business application landscape;
   detecting an object state change in one or more of the object instances;
   filtering each object state change according to the one or more conditions;
   if the one or more conditions are met for an object state change, generating a filtered workflow event;
   mapping the filtered workflow event to a common message proxy to generate a monitoring event message, the common message proxy maintaining routing configuration of a message interface of the monitoring event message from each of one or more systems in the business application landscape to a centralized monitoring process in an event resolution center of a portal server;
   sending the monitoring event message to the centralized monitoring process; and
   executing a guided procedures program in the centralized monitoring process to generate an event resolution.

7. A method in accordance with claim 6, further comprising aggregating monitoring two or more event messages in the centralized monitoring process.

8. A method in accordance with claim 6, further comprising generating an alert based on selected monitoring event messages.

9. A method in accordance with claim 6, further comprising mapping the monitoring event message to the centralized monitoring process according to one or more message mappings stored in a message exchange server.

10. A method in accordance with claim 9, further comprising routing the monitoring event message to the event resolution center based on one or more routing rules in the message exchange server.

11. An article comprising a non-transitory machine-readable medium embodying instructions that when performed by one or more machines result in operations to monitor activity of a heterogeneous systems within a business application landscape, the operations comprising:
    detect, by the one or more machines, an object state change in an object instance of one or more systems of the business application landscape;
    filter, by the one or more machines, each object state change according to one or more conditions related to the object instance;
    if the one or more conditions are met for an object state change, generate, by the one or more machines, a filtered workflow event;
    map, by the one or more machines, the filtered workflow event to a common message proxy to generate a monitoring event message, the common message proxy maintaining routing configuration of a message interface of the monitoring event message from each of one or more systems in the business application landscape to a centralized monitoring process in an event resolution center of a portal server;
    aggregate, by the one or more machines, two or more event messages in the centralized monitoring process; and
    execute, by the one or more machines, a guided procedures program in the centralized monitoring process to generate an event resolution.

12. An article in accordance with claim 11, further comprising an operation to send, by the one or more machines via the common message proxy, the monitoring event message to the centralized monitoring process.

13. An article in accordance with claim 11, further comprising an operation to generate, by the one or more machines, an alert based on selected monitoring event messages.

14. An article in accordance with claim 11, further comprising an operation to map, by the one or more machines, the monitoring event message to the centralized monitoring process according to one or more message mappings stored in a message exchange server.

* * * * *